United States Patent [19]

Westall

[11] Patent Number: 4,631,208
[45] Date of Patent: Dec. 23, 1986

[54] ORGANOSILOXANE-OXYALKYLENE COPOLYMERS

[75] Inventor: Stephen Westall, Barry, Wales

[73] Assignee: Dow Corning, Ltd., Barry, Wales

[21] Appl. No.: 791,956

[22] Filed: Oct. 28, 1985

[30] Foreign Application Priority Data

Nov. 9, 1984 [GB] United Kingdom ............... 8428401

[51] Int. Cl.$^4$ ............................................. B05D 3/02
[52] U.S. Cl. .................................... 427/387; 427/394; 528/15; 528/17; 528/18; 528/19; 528/31; 528/32; 528/34; 556/444; 525/477
[58] Field of Search .............. 528/34, 15, 31, 32, 528/18, 17, 19; 556/444; 427/394, 387; 525/477

[56] References Cited

U.S. PATENT DOCUMENTS

| | | | |
|---|---|---|---|
| 4,283,519 | 8/1981 | Pines et al. | 528/26 |
| 4,490,416 | 12/1984 | Westall et al. | 528/19 |
| 4,515,979 | 5/1985 | Otsuki et al. | 556/445 |

FOREIGN PATENT DOCUMENTS 0032310 7/1981 European Pat. Off. .
1290687 9/1972 United Kingdom .

Primary Examiner—Melvyn I. Marquis
Attorney, Agent, or Firm—George A. Grindahl

[57] ABSTRACT

Organosiloxane-oxyalkylene copolymers in which a silicon atom of at least one organosiloxane unit has attached thereto the group

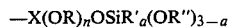

$$-X(OR)_nOSiR'_a(OR'')_{3-a}$$

wherein X represents a divalent hydrocarbon group, R represents an alkylene group having 2 to 4 carbon atoms, n is an integer of at least 2, R' represents alkyl, vinyl, allyl or phenyl, R" represents alkyl or alkoxyalkyl and a has a value of 1 or 2, at least 40% of the total substituents in the copolymer being methyl.

The copolymers are film forming and are particularly suitable for the treatment of textile fibres to facilitate the removal of oily stains during laundering.

8 Claims, No Drawings

ORGANOSILOXANE-OXYALKYLENE COPOLYMERS

This invention relates to copolymers comprising organosiloxane units and oxyalkylene units, and also relates to a process for preparing such copolymers.

Copolymers comprising siloxane units and oxyalkylene units are now well known and have been commercially employed in applications such as surfactants for polyurethane foams and as textile fibre lubricants. In U.K. Pat. No. 290 687 there are disclosed siloxane-poloxyalkylene block copolymers in which there are present methoxy groups attached to silicon atoms. It is stated in the said patent that a preferred application of the block copolymers is in the treatment of hydrophobic fibres to improve their soil resistance. European Patent Application No. 32 310 also discloses copolymers containing siloxane units, oxyalkylene units and silicon-bonded hydrolysable groups, and the use of such copolymers for treating textiles. In the above described prior art copolymers the methoxy groups or hydrolysable groups are attached to a silicon atom in the siloxane chain either directly or by way of an aliphatic hydrocarbon linkage.

According to the present invention there is provided an organosiloxane-oxyalkylene copolymer wherein a silicon atom of at least one organosiloxane unit has attached thereto a group represented by the general formula $$-X(OR)_nOSiR'_a(OR'')_{3-a}$$

wherein X represents a divalent hydrocarbon group having from 2 to 8 inclusive carbon atoms, R represents an alkylene group having from 2 to 4 inclusive carbon atoms, n is an integer of at least 2, R' represents an alkyl group having from 1 to 8 inclusive carbon atoms, a vinyl group, an allyl group or a phenyl group, R'' represents an alkyl or an alkoxyalkyl group having less than 7 carbon atoms and a has a value of 1 or 2, the remaining silicon-bonded substituents in the organosiloxane units being selected from hydrogen atoms, monovalent hydrocarbon groups and groups represented by the general formula $$-X(OR)_nOG$$

wherein X and R are as hereinabove defined and G represents a hydrogen atom, a monovalent hydrocarbon group having from 1 to 10 carbon atoms or an acyl group having from 2 to 6 carbon atoms, at least 40 percent of the total substituents bonded to siloxane silicon atoms in the copolymer being methyl.

In the general formulae hereinabove —(OR)-$_n$—represents an oxyalkylene block having at least 2, preferably from 2 to 50 oxyalkylene units (—OR—). The oxyalkylene units are preferably oxyethylene or oxypropylene or combinations of the two, for example —(OC$_2$H$_4$)$_6$(OC$_3$H$_6$)$_6$—. The group X which links the oxyalkylene block to the siloxane silicon atom may have from 2 to 8 carbons, but, in view of the more ready availability of the polyoxyalkylene precursor, is preferably the propylene group —(CH$_2$)$_3$—.

As the R'' groups there may be present any alkyl or alkoxyalkyl group having less than 7 carbon atoms e.g. methyl, ethyl, propyl, methoxyethyl and ethoxyethyl, the preferred copolymers being those wherein a is 1 and R'' represents methyl, ethyl or methoxyethyl. The R' groups are selected from C$_{1-8}$ alkyl, vinyl, allyl or phenyl groups.

At least one of the above oxyalkylene-containing groups should be present in the copolymer. The number present in any particular case will depend upon such factors as the size of the copolymer molecule desired and the balance sought between the properties bestowed by the siloxane and oxyalkylene portions. The remaining substituents on the siloxane silicon atoms may be selected from hydrogen atoms, monovalent hydrocarbon groups e.g. ethyl, propyl, 2,4,4-trimethylpentyl, vinyl, allyl and phenyl and silicon-free oxyalkylene groups of the formula —X(OR)$_n$OG, wherein G is for example ethyl, butyl or acetyl; with the proviso that at least 40 percent of the total siloxane silicon-bonded substituents are methyl groups. The preferred copolymers of this invention are those wherein the oxyalkylene units OR are oxyethylene and comprise at least 35% of the total weight of the copolymer.

The copolymers of this invention may take any of the molecular configurations available to such copolymers provided such configuration is consistent with the presence of terminal silyl groups on the oxyalkylene block or blocks. For example, they may be of the ABA configuration wherein A represents the $$-X(OR)_nOSiR'_a(OR'')_{3-a}$$

group and B represents a linear siloxane portion e.g. —(M$_2$SiO)$_b$ wherein each M individually represents hydrogen or a monovalent hydrocarbon substituent such as —CH$_3$ and b is an integer of at least 2, A and B being joined through the Si-X linkage. Alternatively the copolymer may be of the so-called "rake" configuration wherein the oxyalkylene blocks are pendant from a siloxane chain as in

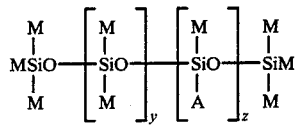

in which y is zero or an integer and z is an integer. According to yet another configuration the oxyalkylene-containing (A) groups may be present both in the pendant positions and attached to the terminal silicon atoms of the siloxane chain. It will thus be apparent that in addition to the siloxane units having oxyalkylene groups attached thereto the copolymers of this invention may also comprise monofunctional M$_3$SiO$_{\frac{1}{2}}$ units, difunctional M$_2$SiO and trifunctional MSiO$_{3/2}$ units. If desired, small proportions of tetrafunctional SiO$_2$ units may also be present.

The copolymers of this invention can be obtained by reacting together (A) an organosiloxane-oxyalkylene copolymer wherein a silicon atom of at least one organosiloxane unit has attached thereto a group of the general formula $$-X(OR)_nOH$$

the remaining silicon-bonded substituents in the organosiloxane units being selected from hydrogen atoms, monovalent hydrocarbon groups and groups represented by the general formula —X(OR)$_n$OG', at least 40 percent of the total substituents bonded to siloxane silicon atoms in the copolymer being methyl groups, and (B) an organosilane $$R'_a Si(OR'')_{4-a}$$

wherein X, R, R', R" and a are as hereinabove defined and G' represents a monovalent hydrocarbon group having from 1 to 10 carbon atoms or an acyl group having from 2 to 6 carbon atoms.

Organosiloxane-oxyalkylene copolymers (A) employed in the said preparative process are a known class of materials. Such copolymers and methods for their preparation are described in, for example, British Pat. Nos. 802 467 and 1 143 206. The silanes (B) are also well-known substances and include ethyl triethoxysilane, vinyl trimethoxysilane, phenyl triethoxysilane and methyl trimethoxysilane, the generally preferred silanes being those wherein R' is selected from methyl, vinyl and phenyl groups and R" is selected from methyl, ethyl and methoxyethyl groups.

Some reaction between (A) and (B) to form the organo-siloxane-oxyalkylene copolymers of this invention is believed to occur at normal ambient temperatures. It is preferred, however, to expedite the reaction by the use of elevated temperatures, for example, from about 30° C. to 180° C., most preferably from 50°–100° C. Preferably also the reaction is carried forward in the presence of a transesterification catalyst, for example zinc tetrafluoroborate, an organic tin compound e.g. stannous octoate or a titanium compound e.g. tetrabutyl titanate.

The relative molar proportions of the reactants employed may be varied to achieve substantially complete reaction of the available —COH groups, or to induce only partial reaction whereby the resulting copolymer product contains both silylated and non-silylated oxyalkylene groups.

The molecular weight of the copolymers of this invention may vary widely and the copolymers may range from mobile liquids to gummy or waxy solids. When a sufficient proportion of oxyethylene units is present the copolymers are water-soluble. The copolymers may therefore be employed alone or in conjunction with other siloxane polymers, e.g. polydimethylsiloxanes or poly(methylhydrogen)siloxanes to form curable films on continuous, porous or fibrous substrates from aqueous or non aqueous solutions or dispersions. Curing of the copolymers into films will take place in the absence of a curing catalyst. It is, however, generally preferred to accelerate the cure by the addition of a siloxane condensation catalyst. A wide variety of such catalysts are known and include, for example acids, bases and metal organic compounds such as the metal carboxylates e.g. dibutyltin dilaurate, stannous octoate and zinc octoate and titanium alkoxides and chelates. Certain substances e.g. zinc tetrafluoroborate and stannous octoate can function both as a transesterification catalyst during the preparation of the siloxaneoxyalkylene copolymer and subsequently as a curing catalyst therefor.

It is also preferred to effect drying and curing of the films at elevated temperatures. The actual temperature employed will depend to some extent on the nature and heat resistance of the substrate, temperatures in the range from about 80° C. to about 180° C. being generally appropriate.

If desired the copolymers of the invention may be mixed with fillers, pigments and other additives to produce compositions curable to rubbery solids having paintable surfaces. The copolymers of this invention are, however, particularly useful for the treatment of textile fibres. We have found that when such fibres e.g. of polyester, nylon or cotton are coated with a cured copolymer of the invention removal of oily stains from the fibres during laundering is facilitated. In such an application of the copolymers they may be applied to the textile as the sole treatment or in conjunction with other silicone or non-silicone treating agents.

The following examples in which Me represents methyl illustrate the invention.

EXAMPLE 1

To a 20 litre split-neck flask equipped with stirrer, condenser and thermometer, was added 12,376 g of a polysiloxane-polyethyleneoxide copolymer having a viscosity of 540 cS at 25° C. and the average composition:

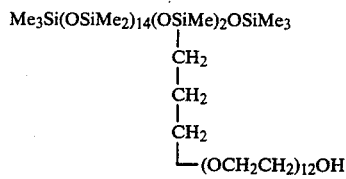

and 1,330 g of methyltrimethoxysilane. The contents of the flask were heated to 80° C. with constant agitation. 14.7 mls of a 40% w/w aqueous solution of $Zn(BF_4)_2$ were added to the flask and agitation at 80° C. was continued for two hours. Upon cooling, there was obtained 13,569 g of a clear, water-soluble, amber liquid having a viscosity of 439 cS at 25° C. and the average formula

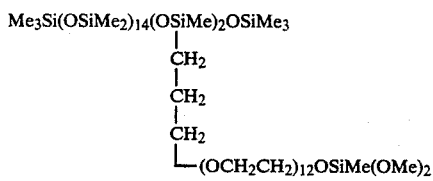

EXAMPLE 2

The copolymer reaction product obtained according to Example 1 was employed to treat a textile substrate as follows.

A plain, undyed 65/35 polyester cotton shirting fabric was treated by padding from an aqueous bath with 1%, based on the weight of the fabric, of the reaction product from the previous example. The treated fabric was dried at 80° C. and further heated for 30 seconds at 190° C. to cure the copolymer.

Both the treated and untreated fabric were evaluated for hydrophilic properties by determining the time taken for a 0.5 ml drop of water to completely wet the fabric. The results were:

|            | Time to Wet Out (Secs) |
|------------|------------------------|
| Untreated  | 160.6                  |
| Treated    | 5.1                    |

The treated and untreated fabrics were soiled with the following oily soils: melted butter, liquid paraffin, olive oil and mayonnaise. The stains were allowed to set for 18 hours. The soiled fabrics were then washed once in a normal front loading automatic washing machine using commercial detergent and a 60° C. programme. After washing, the fabrics were evaluated for stain release using the AATCC stain release replica. The results are shown in the following table on a scale of 1 (worst) to 5 (best).

|  | Stain Release Rating | | | |
| --- | --- | --- | --- | --- |
|  | Butter | Liquid Paraffin | Olive Oil | Mayonnaise |
| Untreated | 3 | 2 | 2.5 | 2 |
| Treated | 3.5 | 2.5 | 3 | 3.5 |

Samples of treated and untreated fabric were also washed 5 times (as before) to test the durability of the finish. These samples were then subjected to the soiling and washing cycle as before. Results were:

|  | Stain Release Rating | | | |
| --- | --- | --- | --- | --- |
|  | Butter | Liquid Paraffin | Olive Oil | Mayonnaise |
| Untreated | 3.5 | 2 | 3 | 2.5 |
| Treated | 3.5 | 3.5 | 4 | 4 |

EXAMPLE 3

Into a 250 ml three-neck flask fitted with stirrer, condenser and thermometer were placed $CH_2=CH.CH_2(OCH_2CH_2)_{12}OCOCH_3$ (33.21 g) and $CH_2=CHCH_2(OCH_2CH_2)OH$ (4.19 g). To the flask was then added 8.5 μl of a 10% w/w solution of hexachloroplatinic acid in isopropyl alcohol and the contents heated to 80° C. with stirring under an inert atmosphere.

The siloxane copolymer

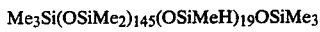

$Me_3Si(OSiMe_2)_{145}(OSiMeH)_{19}OSiMe_3$ (40.11 g) was added to the contents of the flask and the temperature maintained at 80° C. until infra red analysis indicated the complete disappearance of the SiH absorption. Methyl trimethoxysilane (1.9 g) and 50 μl of 40% w/w aqueous solution of $Zn(BF_4)_2$ were then introduced into the flask and the temperature maintained at 80° C. for a further 2 hours. The reaction product recovered from the flask was an amber-coloured, water-dispersible copolymer having the general configuration of the original siloxane copolymer reactant except that the silicon-bonded hydrogen atoms had been replaced by $CH_2=CHCH_2(OCH_2CH_2)_{12}O.CO.CH_3$ and $CH_2=CHCH_2(OCH_2CH_2)_{12}OSiCH_3(OCH_3)_2$ groups.

EXAMPLE 4

A piece of plain, undyed 65/35 polyester/cotton shirt fabric was treated by padding with an aqueous composition containing a high molecular weight, hydroxyl-terminated polydimethylsilane, $MeSi(OMe)_3$ and a bis(-laurylmercaptide) tin compound as catalyst in a ratio by weight of 20/1/2 respectively. The treated fabric was then heated at 190° C. for 30 seconds to dry and cure the siloxane/silane which was present in a proportion of 1% by weight based on the weight of the fabric.

A second piece of the same fabric was similarly treated except that the treating composition additionally contained the copolymer prepared in Example 3. Sufficient of the copolymer was employed to provide a 1% by weight pick up of the copolymer and result in a total add-on of 2% by weight.

The treated fabric pieces were laundered 5 times in a domestic washing machine employing the 60° C. programme. The dried pieces, together with an untreated piece of fabric as control, were then soiled with butter, liquid paraffin, olive oil and mayonnaise and the stain release properties evaluated as described in Example 2. In the following table, which sets out the results of the evaluation, the appearance of the residual stain is indicated on a scale of from 1 to 5, the higher value the more complete the removal of the stain.

|  | Stain Release Rating | | | |
| --- | --- | --- | --- | --- |
|  | Butter | Liquid Paraffin | Olive Oil | Mayonnaise |
| Control (Untreated) | 4.0 | 3.0 | 3.5 | 3.5 |
| Siloxane/ Silane | 3.0 | 1.0 | 3.0 | 2.0 |
| Siloxane/ Silane/ Copolymer | 4.5 | 3.5 | 4.0 | 4.0 |

The embodiments of the invention in which an exclusive property or privilege is claimed are as defined as follows:

1. An organosiloxane-oxyalkylene copolymer wherein a silicon atom of at least one organosiloxane unit has attached thereto a group represented by the general formula $$-X(OR)_nOSiR'_a(OR'')_{3-a}$$

wherein X represents a divalent hydrocarbon group having from 2 to 8 inclusive carbon atoms, R represents an alkylene group having from 2 to 4 inclusive carbon atoms, n is an integer of at least 2, R' represents a group selected from the group consisting of alkyl groups having from 1 to 8 inclusive carbon atoms, the vinyl group, the allyl group and the phenyl group, R" represents an alkyl or an alkoxyalkyl group having less than 7 carbon atoms and a has a value of 1 or 2, the remaining silicon-bonded substituents in the organosiloxane units being selected from hydrogen atoms, monovalent hydrocarbon groups and groups represented by the general formula $$-X(OR)_nOG$$

wherein X and R are as hereinabove defined and G is a substituent selected from the group consisting of the hydrogen atom, monovalent hydrocarbon groups having from 1 to 10 inclusive carbon atoms and acyl groups having from 2 to 6 inclusive carbon atoms, at least 40 percent of the total substituents bonded to siloxane silicon atoms in the copolymer being methyl.

2. A copolymer as claimed in claim 1 wherein the OR units are oxyethylene units and comprise at least 35 percent of the total copolymer weight.

3. A copolymer as claimed in claim 2 wherein n has a value of from 2 to 50.

4. A copolymer as claimed in claim 1 wherein a is 1 and R" represents the methyl, ethyl or methoxy-ethyl group.

5. A process for the preparation of an organosiloxane-oxyalkylene copolymer as defined in claim 1 which comprises reacting together (A) an organosiloxane-oxyalkylene copolymer wherein a silicon atom of at least one organosiloxane unit has attached thereto a group of the general formula —X(OR)$_n$OH the remaining silicon-bonded substituents in the organosiloxane units being selected from the group consisting of atoms, monovalent hydrocarbon groups and groups represented by the general formula —X(OR)$_n$OG', at least 40 percent of the total substituents bonded to siloxane silicon atoms in the copolymer being methyl groups, and (B) an organosilane $$R'_aSi(OR'')_{4-a}$$

wherein X, R, R', R'' and a are as defined in claim 1 and G' represents a monovalent hydrocarbon group having from 1 to 10 carbon atoms or an acyl group having from 2 to 6 carbon atoms.

6. A process as claimed in claim 5 wherein the reaction is carried out in the presence of a transesterification catalyst.

7. A process for coating a substrate which comprises applying thereto an organosiloxane-oxyalkylene copolymer as defined in claim 1.

8. A process as claimed in claim 7 wherein the substrate comprises textile fibres.

* * * * *